US009602569B2

(12) United States Patent
Miller et al.

(10) Patent No.: US 9,602,569 B2
(45) Date of Patent: Mar. 21, 2017

(54) MANAGEMENT OF A REMOTE DIGITAL TERMINAL

(71) Applicant: METASWITCH NETWORKS LIMITED, Enfield, London (GB)

(72) Inventors: Craig Miller, Dallas, TX (US); John Batty, London (GB); John Tucker, Herts (GB); Mark Overton, Hertford (GB); Shriman Gurung, Herndon, VA (US); Doug Theobald, Carrollton, TX (US); David Smith, Plano, TX (US)

(73) Assignee: Metaswitch Networks Limited, London (GB)

( * ) Notice: Subject to any disclaimer, the term of this patent is extended or adjusted under 35 U.S.C. 154(b) by 411 days.

(21) Appl. No.: 13/767,678

(22) Filed: Feb. 14, 2013

(65) Prior Publication Data

US 2014/0226653 A1 Aug. 14, 2014

(51) Int. Cl.
*H04L 29/06* (2006.01)
*H04L 12/66* (2006.01)
*H04L 12/64* (2006.01)

(52) U.S. Cl.
CPC ............ *H04L 65/607* (2013.01); *H04L 12/66* (2013.01); *H04L 12/64* (2013.01)

(58) Field of Classification Search
CPC ....... H04L 65/607; H04L 12/64; H04L 65/00; H04L 29/0809; H04M 11/002; H04M 2215/7813; H04M 1/2535

(Continued)

(56) References Cited

U.S. PATENT DOCUMENTS 5,608,720 A * 3/1997 Biegel .................... H04J 3/1611
370/249
5,805,298 A * 9/1998 Ho ....................... H04L 12/5692
358/402

(Continued)

OTHER PUBLICATIONS

Simpson, W., "PPP in HDLC Framing", Dec. 1993, Network Working Group https://tools.ietf.org, Request for Comments: 1549, pp. 1-2.*

(Continued)

*Primary Examiner* — Un C Cho
*Assistant Examiner* — Shah Rahman
(74) *Attorney, Agent, or Firm* — Stetina Brunda Garred & Brucker

(57) ABSTRACT

Telecommunications equipment may require network connectivity. On newer systems, an additional local management interface is provided for proprietary maintenance functions, typically via a shell-based Command Line Interface. This is not available on remote sites with only TDM connections. The invention provides a method of communicating between a management console and remote access equipment via a class 4 telecommunications switch, which comprises establishing an IP connection, establishing a synchronous telecommunications transport connection between the class 5 switch and the remote access equipment, setting up a voice call between the management console and the remote access equipment, passing the voice call over the IP connection as a VOIP call, passing the voice call over the synchronous telecommunications transport connection as a PCM encoded call, and encapsulating an IP data stream in the VOIP and PCM encoded call to establish an end-to-end IP.

15 Claims, 4 Drawing Sheets

(58) Field of Classification Search
USPC .................. 370/352, 353, 354, 355, 356
See application file for complete search history.

(56) References Cited

U.S. PATENT DOCUMENTS

| | | | |
|---|---|---|---|
| 6,229,793 B1* | 5/2001 | Jawanda .................. | 370/328 |
| 6,839,342 B1* | 1/2005 | Parham et al. ............ | 370/352 |
| 7,564,840 B2* | 7/2009 | Elliott et al. .............. | 370/356 |
| 2002/0099854 A1* | 7/2002 | Jorgensen ................ | 709/249 |
| 2004/0013122 A1* | 1/2004 | John Kott ............ | H04L 12/66 |
| | | | 370/401 |
| 2004/0072593 A1* | 4/2004 | Robbins et al. ........... | 455/560 |
| 2004/0246990 A1* | 12/2004 | Krishnamurthi .. | H04W 36/0022 |
| | | | 370/466 |
| 2006/0050862 A1* | 3/2006 | Shen .................. | H04L 12/2856 |
| | | | 379/219 |
| 2008/0002669 A1* | 1/2008 | O'Brien et al. ........... | 370/352 |
| 2008/0112407 A1* | 5/2008 | Liu ........................... | 370/389 |
| 2008/0177644 A1* | 7/2008 | Reese ........................ | 705/30 |
| 2011/0063982 A1* | 3/2011 | Elder .................... | H04L 12/66 |
| | | | 370/241 |
| 2012/0294304 A1* | 11/2012 | Forte-McRobbie | H04L 29/06027 |
| | | | 370/352 |

OTHER PUBLICATIONS

Kotler, "Sounds Like Botner", Aug. 2011, Security Art, p. 23.*
ITU-T, "Modem-over-IP networks: Procedures for the end-to-end connection of V-series DCEs", Jan. 2003, ITU-T Telecommunication Standardization Sector of ITU, V.150.1 (Jan. 2003), pp. 6-8.*
O'Neill et al., "An overview of Internet protocols", Jan. 1998, BT Technol, vol. 16 No. 1, pages: all.*

* cited by examiner 8 bit buffer - 10 bytes (A-J)

| A7 | A6 | A5 | A4 | A3 | A2 | A1 | A0 |
| B7 | B6 | B5 | B4 | B3 | B2 | B1 | B0 |
| C7 | C6 | C5 | C4 | C3 | C2 | C1 | C0 |
| D7 | D6 | D5 | D4 | D3 | D2 | D1 | D0 |
| E7 | E6 | E5 | E4 | E3 | E2 | E1 | E0 |
| F7 | F6 | F5 | F4 | F3 | F2 | F1 | F0 |
| G7 | G6 | G5 | G4 | G3 | G2 | G1 | G0 |
| H7 | H6 | H5 | H4 | H3 | H2 | H1 | H0 |
| I7 | I6 | I5 | I4 | I3 | I2 | I1 | I0 |
| J7 | J6 | J5 | J4 | J3 | J2 | J1 | J0 |

7 bit buffer - 12 bytes

| A6 | A5 | A4 | A3 | A2 | A1 | A0 | 0 |
| B5 | B4 | B3 | B2 | B1 | B0 | A7 | 0 |
| C4 | C3 | C2 | C1 | C0 | B7 | B6 | 0 |
| D3 | D2 | D1 | D0 | C7 | C6 | C5 | 0 |
| E2 | E1 | E0 | D7 | D6 | D5 | D4 | 0 |
| F1 | F0 | E7 | E6 | E5 | E4 | E3 | 0 |
| G0 | F7 | F6 | F5 | F4 | F3 | F2 | 0 |
| G7 | G6 | G5 | G4 | G3 | G2 | G1 | 0 |
| H6 | H5 | H4 | H3 | H2 | H1 | H0 | 0 |
| I5 | I4 | I3 | I2 | I1 | I0 | H7 | 0 |
| J4 | J3 | J2 | J1 | J0 | I7 | I6 | 0 |
| 0  | 0  | 0  | 0  | J7 | J6 | J5 | 0 |

MANAGEMENT OF A REMOTE DIGITAL TERMINAL

BACKGROUND OF THE INVENTION

This invention relates to methods and apparatus for management of remote access equipment in a telecommunications network.

Existing telecommunications equipment may require network connectivity for data transfer such as control, status and configuration information, but may have no external interfaces except for the TDM voice circuits to which they are connected. A Remote Digital Terminal (RDT) is one such example of this kind of equipment. The RDT, commonly called "remote access equipment", terminates subscriber lines and communicates via an industry standard GR-303 interface to an Integrated Digital Terminal (IDT) switching system (a class 5 switch).

An Embedded Operations Channel (EOC) is provided in the GR-303 standard to add, modify, and delete subscriber lines and to provide some basic level of maintenance activity to an operator. This EOC however, does not necessarily provide an industry standard interface for all possible maintenance activity for a given RDT, primarily due to vendor specific hardware architectures.

Thus on most newer systems, an additional local management interface is provided on the RDT for specialised or vendor specific maintenance functions. This is typically accessed using a proprietary user interface via a shell-based Command Line Interface, either through a serial port or from a Telnet interface over an Ethernet port. Neither the serial port nor the Ethernet port is accessible when an RDT is deployed remotely, since these connection protocols are only designed to operate over relatively short distances. Thus any vendor specific maintenance interfaces are made unavailable to a remote operator when an RDT is installed remotely without some other form of communication channel in addition to the GR-303 link. This is termed a "dark" office, in which no serial port or internet connection is available. In such deployments, the only possible connectivity is via a T1 facility, using a DS0 attached to a High Level Data Link Control (HDLC) framer for digital communications. This requirement adds complexity and cost to remote installations since either extra hardware must be installed to provide full remote operation, or personnel must visit the RDT site periodically to use the local management interface. Also, if the legacy IDT associated with a given RDT is replaced with next generation equipment, this proprietary interface may become unavailable.

An object of the invention is to provide a mechanism to create network connections between an IDT and an RDT, without modifying the next generation equipment.

SUMMARY OF THE INVENTION

Increasingly, IDTs are being replaced by next generation softswitch/media gateway combinations that have Voice over IP (VoIP) capability as well as a GR-303 interface.

The invention defines an architecture that can create a TCP/IP network using a voice circuit that starts as a VoIP channel from a remote management workstation that is switched through an IDT to a Remote Digital Terminal as a TDM circuit. The invention uses a standard RTP stream as a data channel. RTP is typically used to carry voice and not data in a next generation network. The RTP stream is connected to a GR-303 voice channel by initiating a standard SIP call such that the IDT and its associated Media Gateway are unaware that the RTP stream is carrying data. The data is transmitted using industry standard PPP/HDLC protocols and appears to the client application as simply another network interface that can be used by Telnet, FTP, or any other network oriented application to access the RDT.

Objects, advantages and features of the present invention will become readily apparent to those skilled in the art from a study of the following description of the exemplary preferred embodiments when read in conjunction with the attached drawings and the appended claims.

DESCRIPTION OF THE EXEMPLARY PREFERRED EMBODIMENTS

Figure 1:
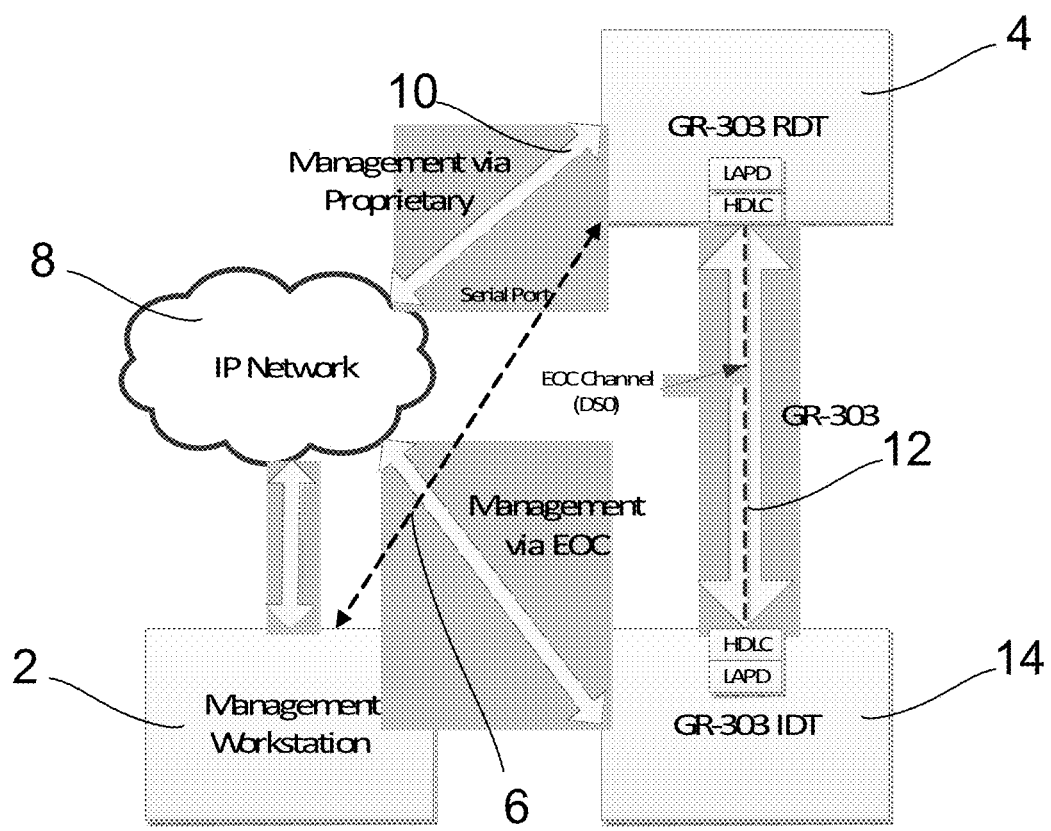
FIG. 1 is a schematic block diagram of a prior art configuration of an RDT controlled by an IDT, communicating over an EOC channel and a Management Workstation communicating over an IP based network or a short serial link.

FIG. 1 shows a typical prior art network architecture of a GR-303 based switching system. A management workstation 2 is coupled to a vendor specific control interface of remote access equipment, typically an RDT 4, via a serial link 6, using for example an RS-232 protocol. The management workstation 2 is also connected to an IP network 8 such as a Local Area Network (LAN) or Wide Area Network (WAN) which provides an alternative path 10 to the vendor specific management interface. An Embedded Operations Channel (EOC) 12 is used for simple maintenance procedures and some flow-through provisioning as provided in the GR-303 standard. The EOC uses industry standard HDLC framing and Link Access Procedures, D channel (LAPD) link management over a fixed DS0 timeslot in order to communicate digitally between the IDT and the RDT.

Thus the Management Workstation 2 typically has two ways to manage the RDT 4. It can either use the interface provided by an IDT 14 that will expose the standard capabilities of the EOC channel 12, or it can use a proprietary interface provided by the RDT either via TCP/IP or a serial port that can give the operator access to a richer set of management capabilities. Note that connecting a serial port to the Management Workstation 2 requires that the Management Workstation 2 and the RDT 4 be located in the same facility, since serial port cables are limited in length. At 19,200 bits per second, the recommended length of an RS-232 cable is only 50 feet (15.24 m). The alternative of the TCP/IP connection 10 to the RDT requires additional networking equipment such as Ethernet routers and firewalls (not shown) to be co-located with the RDT.

HDLC framing can also support (Point-to-Point Protocol) PPP link management in addition to LAPD. PPP is a well known protocol that is commonly used as a link layer for running TCP/IP stacks over serial ports and enabling applications like Telnet, to open a shell console on a remote server.

Figure 2:
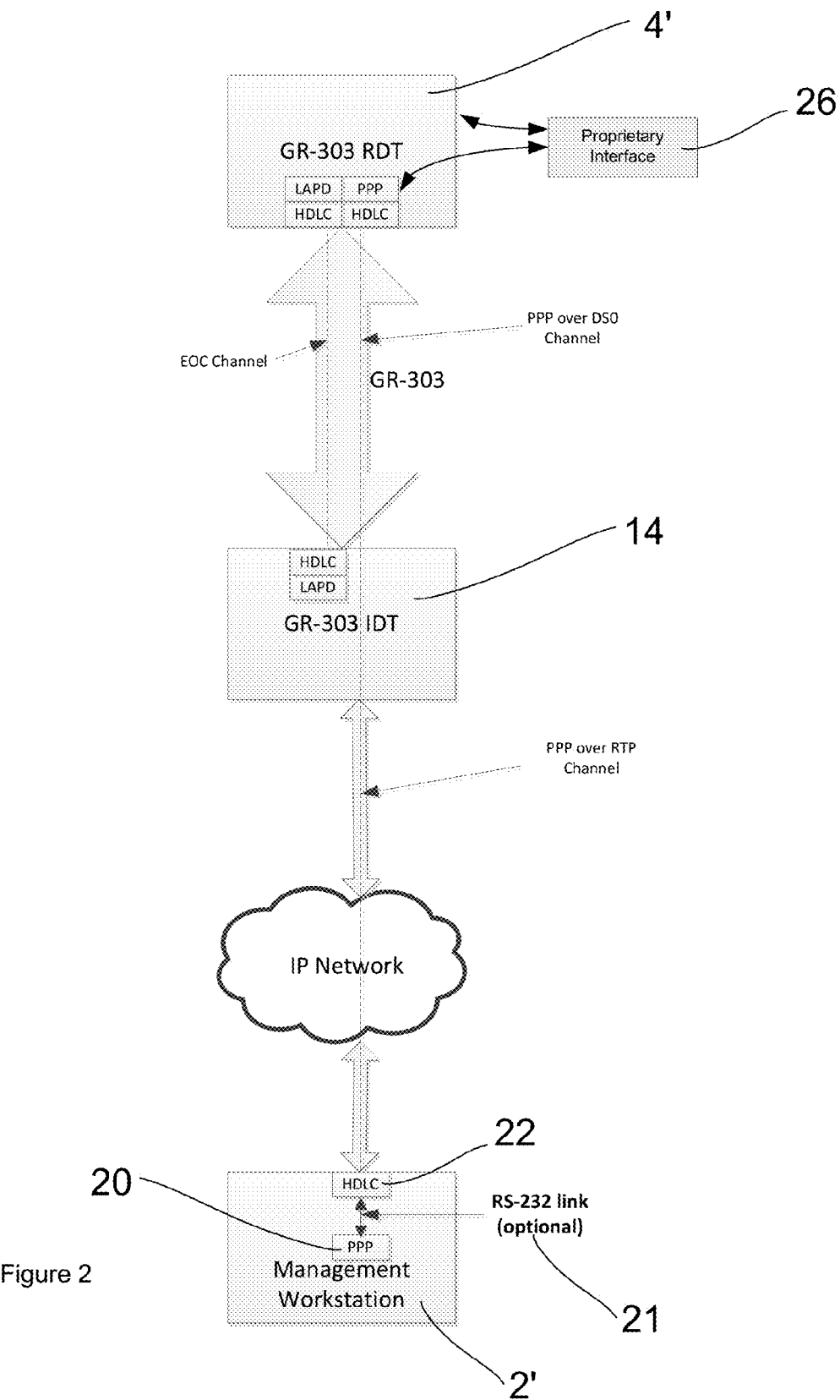
FIG. 2 is a schematic block diagram of a proposed architecture, with an IP based network constructed from an RTP stream and a DS0.

If TCP/IP connectivity can be enabled via a DS0 on the GR-303 interface using PPP, then it is possible that a management console 2' can be attached transparently to access the proprietary management interface of an RDT 4' through the IDT system 14 without modifying the IDT itself and without requiring additional Internet (TCP/IP) connectivity. FIG. 2 shows this new configuration. Note that there is no direct IP network connectivity to the RDT 4' from the Management Workstation. All connections between the IDT 14 and the RDT 4' are carried over a conventional GR303 connection using a conventional DS0 channel.

To set up the various encapsulated connections through the IDT 14, several complex steps are required, which are described in detail below. Broadly, at the management workstation 2', a PPP adaptor 20 communicates via an optional RS-232 serial interface 21. The raw PPP data is read, sent to an HDLC framer 22, and subsequently transmitted over a VOIP stream, ultimately to the RDT 4' where it is decoded back into a serial stream for connection to a proprietary management interface 26. Once a PPP link has been established to the RDT 4' at the far end, an IP communications path is created via Telnet or some other such protocol, and the Command Line Interface (CLI) functions of the RDT 4' are natively invoked using the management workstation 2'.

In detail, starting at the workstation 2', the PPP stack 20 is connected to a serial driver. This serial interface can be deployed either using a physical interface (i.e. a port on the back of the workstation itself), or as a virtual interface using a virtual serial driver. Since the output of the PPP stack 20 is not modified in any way by the serial port itself this serial interface 21 is an optional component, as the raw PPP output can be fed directly into the HDLC interface if desired. Indeed since this data is unmodified, any medium of data exchange is allowable to present the raw PPP output to the HDLC framer. If present, the RS-232 serial interface 21 is looped back into the management workstation itself, requiring typically two interfaces; one for input and one for the output. In any scenario, the PPP output attaches to an HDLC framer 22 that transmits packets via a VOIP codec such as a G.711 codec, using the RTP VoIP protocol over a User Datagram Protocol (UDP) socket. This RTP stream is set up using a standard Session Initiation Protocol (SIP) call to a predetermined phone number that translates to a circuit ID that the RDT 4' recognises as a request for IP connectivity. An arbitrary DS0 timeslot is used for this "voice" call.

Figure 3:
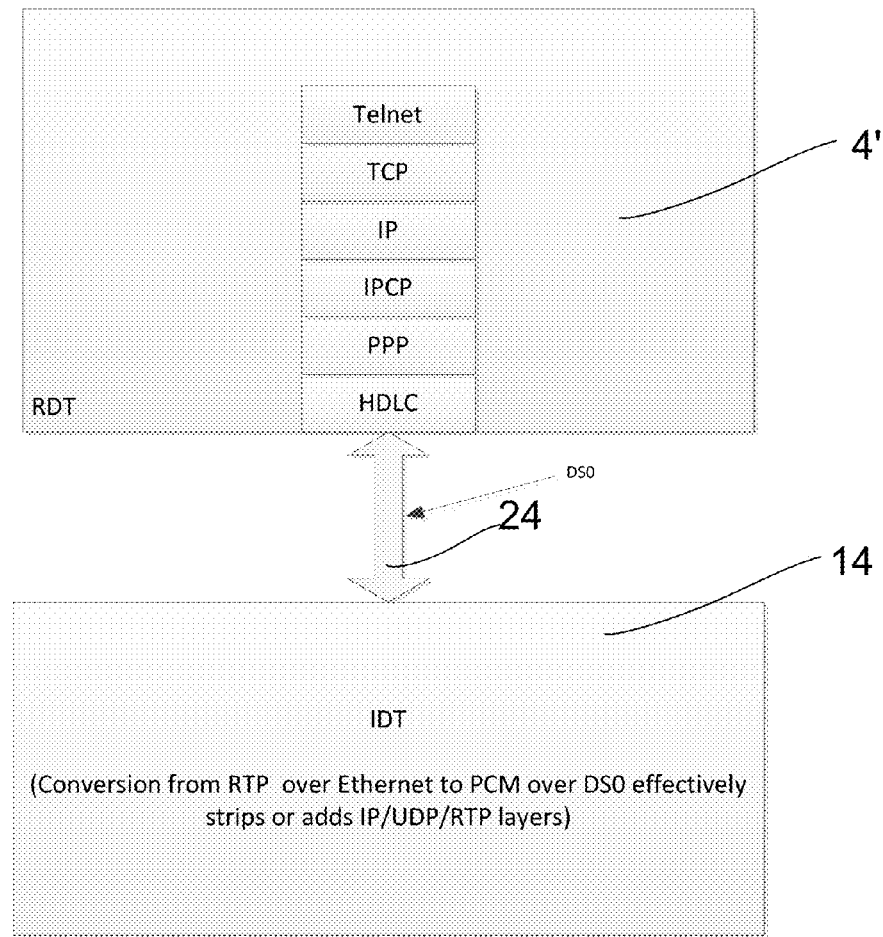
FIG. 3 shows the protocol stack layering required to achieve the network configuration of FIG. 2, from a network element perspective.
Figure 3:
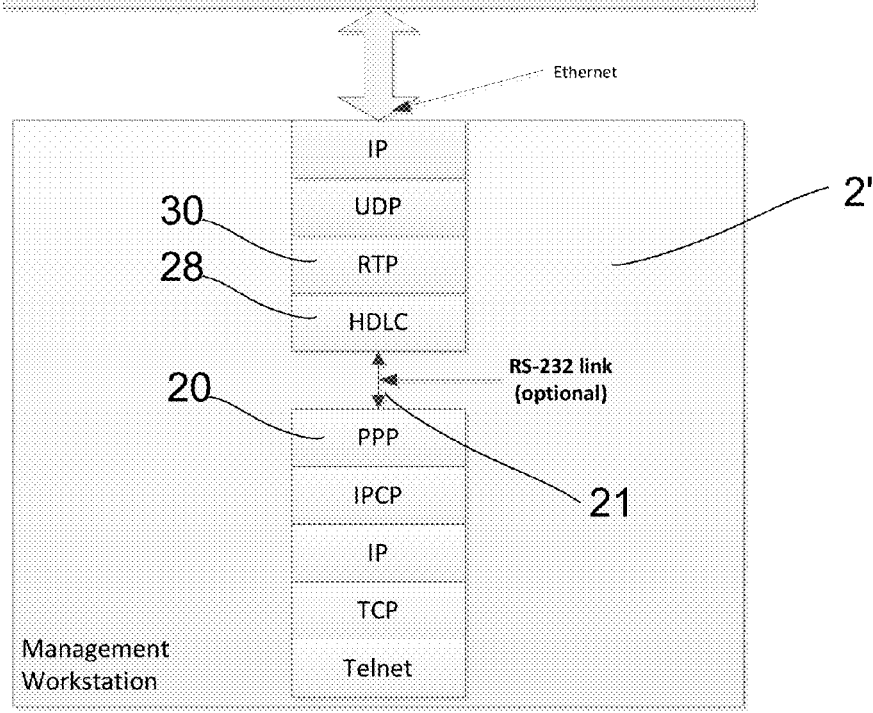

FIG. 3 shows a view of the system from a protocol stack standpoint.

The SIP call is initiated by a management application on the workstation 2', using the IP Address of the PPP port 20 as the local RTP address. A stand-alone software application on the management workstation 2' hides both the SIP session initiation phase and establishment of the telnet session from a workstation user to make the operator activity appear seamless.

The IDT 14 sees this as a normal SIP voice call, and connects the RTP stream through to a DS0 24 using standard call processing i.e. converting from VOIP to a non-VOIP standard voice call using PCM over a DS0. This is the conventional operation of the IDT 14 in receipt of a VOIP call, and thus no modification to the IDT is necessary. The process of connecting the RTP data stream to a DS0 strips the RTP/UDP/IP headers, leaving only the HDLC/PPP and higher layers to communicate directly with the network interface on the RDT 4'.

At the RDT 4', the number called is recognised as initiating a call carrying PPP data. Instead of this call being routed out to subscribers in the normal way, it is instead intercepted and passed up through the stack shown in FIG. 3. Gradually the encapsulation layers are removed until a TCP/IP and Telnet stream becomes available for looping back into the proprietary management interface on the IDT. Likewise, data to be transmitted from the RDT 4' to the workstation 2' is passed down through the stack shown in FIG. 3, before being passed back along the T1 connection 24.

The call interception functionality may be provided natively in the RDT 4' when the destination number is the special PPP number. In this special case, the call initiation and subsequent voice data are intercepted and processed as described above.

Once a PPP network is established from end-to-end between the workstation 2' and the RDT 4', applications such as Telnet and FTP may be used to access the native functionality of the RDT 4' and to perform operation such as file transfers. These commands may be used in conjunction with EOC commands so that a user may simultaneously issue EOC and proprietary commands via the workstation 2'.

Figures 4, 5:
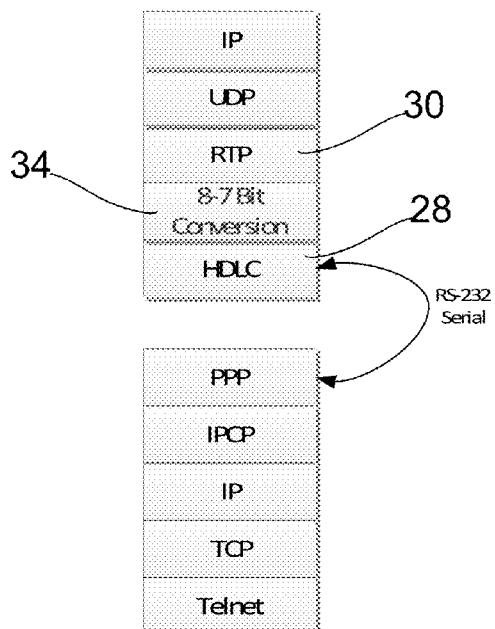
FIG. 4 shows the relationship between 8 bit buffers operated upon by the HDLC layer and 7 bit buffers transmitted and received by the RTP layer in order to bypass the robbed-bit signalling effects of a 56K DS0 channel.
FIG. 5 shows how this conversion layer fits into the protocol stack configuration of the management workstation stack of FIG. 3.

With reference to FIGS. 4 and 5, for a 56 Kbit/s DS0 link used by standard GR-303 interfaces, an additional conversion layer 34 is inserted by the management software client on the management workstation 2', between the HDLC framer 28 and the RTP interface 30. This is done because 56K DS0's use the Least Significant Bit (LSB) of every 6th frame for robbed bit signalling, which would corrupt the data in the PPP link. It will be appreciated that this additional conversion layer is not typically required when out-of-band signalling is used e.g. over an E1 span or a Clear Channel T1 trunk.

Preferably, an 8 bit to 7 bit conversion is used which then ensures no data for the PPP link is carried in the LSB of the DS0 portion of the connection between the management workstation 2' and the RDT 4'. Other coding schemes could be used as long as the PPP data is not stored in the "robbed" bit in the DS0 channel or by applying some error correction capability to the PPP link e.g. by an additional layer of data coding.

Accordingly, the HDLC framer 28 works on 8 bit data and then this data is converted to a 7 bit stream prior being sent to the RTP layer 30, where the LSB of the 7 bit buffer is ignored. This is shown as zero entries in column 32 of the 7 bit buffer of FIG. 4. FIG. 4 illustrates both 8 bit and 7 bit buffers in this conversion. This ensures that no matter which frame is used by the PCM converter for robbed bit signalling, the original payload stays intact. Likewise, data from the RTP stream (coming back from the RDT 4') is in a 7 bit form and is converted to an 8 bit buffer prior to being passed to the HDLC framer 28 for decoding. In this example, the conversion is achieved by keeping the order of the bits but shifting the LSB of the 8 bit word into the most significant bit position (MSB) of the next byte and shifting the existing bits in the next byte, down, to make room for the new MSB. This is a particularly elegant technique and may speedily be accomplished in software or even with a hardware shift register without introducing significant latency. However it will be appreciated that other bit conversion methods may be used.

Whilst the example above has been described in connection with a T1 DS0 connection, it will be appreciated that the technique may be used when other synchronous telecommunications transports are used, such as an E0 connection and on optical or non-optical connections, between an IDT and the RDT. Note that it is not the data transport mechanisms that are of importance, and indeed any form of data transport may be used, but rather it is the various protocol stacks combined in the described manner that supports the novel and non-obvious techniques disclosed herein.

The Management client software application is preferably capable of initiating communications with multiple RDTs. Each RDT node is therefore given a unique network address established for use by the PPP protocol. These network addresses may be statically configured using a configuration database with the phone number at which the RDT can be reached.

The Management Client is preferably configured with the following data for each RDT:

RDT Name
RDT Phone Number
RDT PPP Remote Address
RDT PPP Local Address

This information may be used transparently by the Management Client software so that a user only need select a particular RDT to manage without needing to know the intricacies of the connection setup and encapsulation of PPP in RTP.

There has been described hereinabove novel apparatus and methods for management of a remote digital terminal. Those skilled in the art may now make numerous uses of and departures from the above described exemplary preferred embodiments without departing from the inventive principles disclosed herein. Accordingly the present invention is to be defined solely by the permissible scope of the appended claims.

What is claimed is:

1. A method of communicating between a management console and a remotely located remote digital terminal for terminating subscriber lines, via a class 5 telecommunications switch, comprising the steps of
    establishing an IP connection between the management console and the class 5 switch,
    establishing a synchronous telecommunications transport connection between the class 5 switch and the remote digital terminal,
    setting up a voice call between the management console and the remote digital terminal,
    passing the voice call over the IP connection as a VOIP call,
    passing the voice call over the synchronous telecommunications transport connection as a PCM encoded call,
    encapsulating an IP data stream as voice call data in the VOIP and PCM encoded voice call,
    recognizing, at the remote digital terminal, that the call relates to controlling the operation of the remote digital terminal, and
    extracting the IP data stream to establish an end-to-end IP connection between the management console and the remote digital terminal, for controlling the operation of the remote digital terminal.

2. A method as claimed in claim 1, wherein the IP data stream is encapsulated in the VOIP call as a PPP connection in an RTP data stream.

3. A method as claimed in claim 2 wherein the management console includes a serial loopback and the method includes reading raw data from a PPP stack for conversion to an RTP data stream.

4. A method as claimed in claim 1, including converting the IP data stream from an 8 bit data stream to a 7 bit data stream before transmitting it from the management console to the class 5 switch.

5. A method as claimed in claim 1 including providing a configuration database in the management console, which holds a plurality of address records relating to a respective plurality of remote digital terminals and including at least a destination address for each remote digital terminal, and interrogating the database to retrieve the destination address for a remote digital terminal, responsive to a user request, prior to setting up the voice call between the management console and the remote digital terminal.

6. A computer program product being embodied on a non-transitory storage medium and comprising computer executable code which when executed on a management console causes the management console to set up communications between the management console and a remotely located remote digital terminal for terminating subscriber lines, via a class 5 telecommunications switch, by
    establishing an IP connection between the management console and the class 5 switch,
    establishing a voice call between the management console and the remote digital terminal which is carried to the class 5 switch using a VOIP data stream,
    encapsulating a PPP connection in the VOIP data stream as voice call data,
    sending raw PPP data to the remote digital terminal over the PPP connection to establish an end-to-end IP connection between the management console and the remote digital terminal, and
    recognizing, at the remote digital terminal, that the call relates to controlling the operation of the remote digital terminal; and
    extracting the PPP data stream.

7. The computer program product as claimed in claim 6, which further causes the management console to convert the data stream in the encapsulated PPP connection, from an 8 bit data stream to a 7 bit data stream before transmitting it from the management console to the class 5 switch.

8. The computer program product as claimed in claim 6, which further causes the management console to maintain a configuration database, which holds a plurality of address records relating to a respective plurality of remote digital terminals including at least a destination address for each remote digital terminal, and to interrogate the database to retrieve the destination address for a remote digital terminal, responsive to a user request, prior to establishing the voice call between the management console and the remote digital terminal.

9. A management console, for controlling the operation of a remote digital terminal for terminating subscriber lines, comprising a processor and an IP interface couplable to a class 5 telecommunications switch, the processor being operable to generate signals on the IP interface to set up communications between the management console and the remote digital terminal via a class 5 telecommunications switch, to establish an IP connection between the management console and a class 5 switch, to establish a voice call between the management console and the remote digital terminal which is carried to a class 5 switch using a VOIP data stream, to encapsulate a PPP connection in the VOIP data stream as voice call data, and to send raw PPP data to the remote digital terminal adapted to identify calls which relate to controlling the operation of the remote digital terminal and extract the raw PPP data stream sent over the PPP connection to establish an end-to-end IP connection between the management console and the remote digital terminal.

10. A management console as claimed in claim 9, wherein the processor is further operable to convert the data stream in the encapsulated PPP connection, from an 8 bit data stream to a 7 bit data stream before transmitting it via the IP interface, from the management console to a class 5 switch.

11. A management console as claimed in claim 9, further comprising a memory holding a configuration database, arranged to hold a plurality of address records relating to a respective plurality of remote digital terminals and arranged to include at least a destination address for each remote digital terminal, the processor being operable to interrogate the database to retrieve the destination address for a remote digital terminal, responsive to a user request, prior to establishing a voice call between the management console and said remote digital terminal.

12. An interface unit having a telecommunications input operable to receive a synchronous telecommunications transport connection and couplable to a class 5 telecommunications switch, a telecommunications output operable to provide a synchronous telecommunications transport output and couplable to a remote digital terminal for terminating subscriber lines, a console output couplable to a proprietary interface on said remote digital terminal for controlling the remote digital terminal, and a processor operable to recognize a call setup request for a predetermined voice number, to intercept the voice call data for that call, to process the voice data to retrieve a raw PPP stream encapsulated in the voice call data, and to pass the PPP stream to the console output.

13. Remote digital terminal for terminating subscriber lines, having a telecommunications interface operable to receive a synchronous telecommunications transport connection and couplable to a class 5 telecommunications switch, a console input for receiving user input, and a processor operable to recognise a call setup request for a predetermined voice number, to intercept the voice call data for that call, to process the voice data to retrieve a raw PPP data stream encapsulated in the voice call data to determine that the call is relating to controlling the operation of the remote digital terminal, and to pass the raw PPP stream to a console input.

14. Remote digital terminal, as claimed in claim 13, wherein the processor is operable to convert a PPP data stream into an HDLC encapsulated data stream for output via the telecommunications interface.

15. Remote digital terminal, as claimed in claim 14, wherein the processor is arranged to convert the PPP data stream from an 8 bit data stream to a 7 bit data stream before transmitting it from the telecommunications interface.

* * * * *